May 26, 1970     A. G. PFAELZER ET AL     3,514,569
RESISTANCE WELDER

Filed Dec. 28, 1967                                   5 Sheets-Sheet 1

INVENTORS
ARTHUR G. PFAELZER
THOMAS E. SALZER

BY    *Edgar O. Post*

ATTORNEY

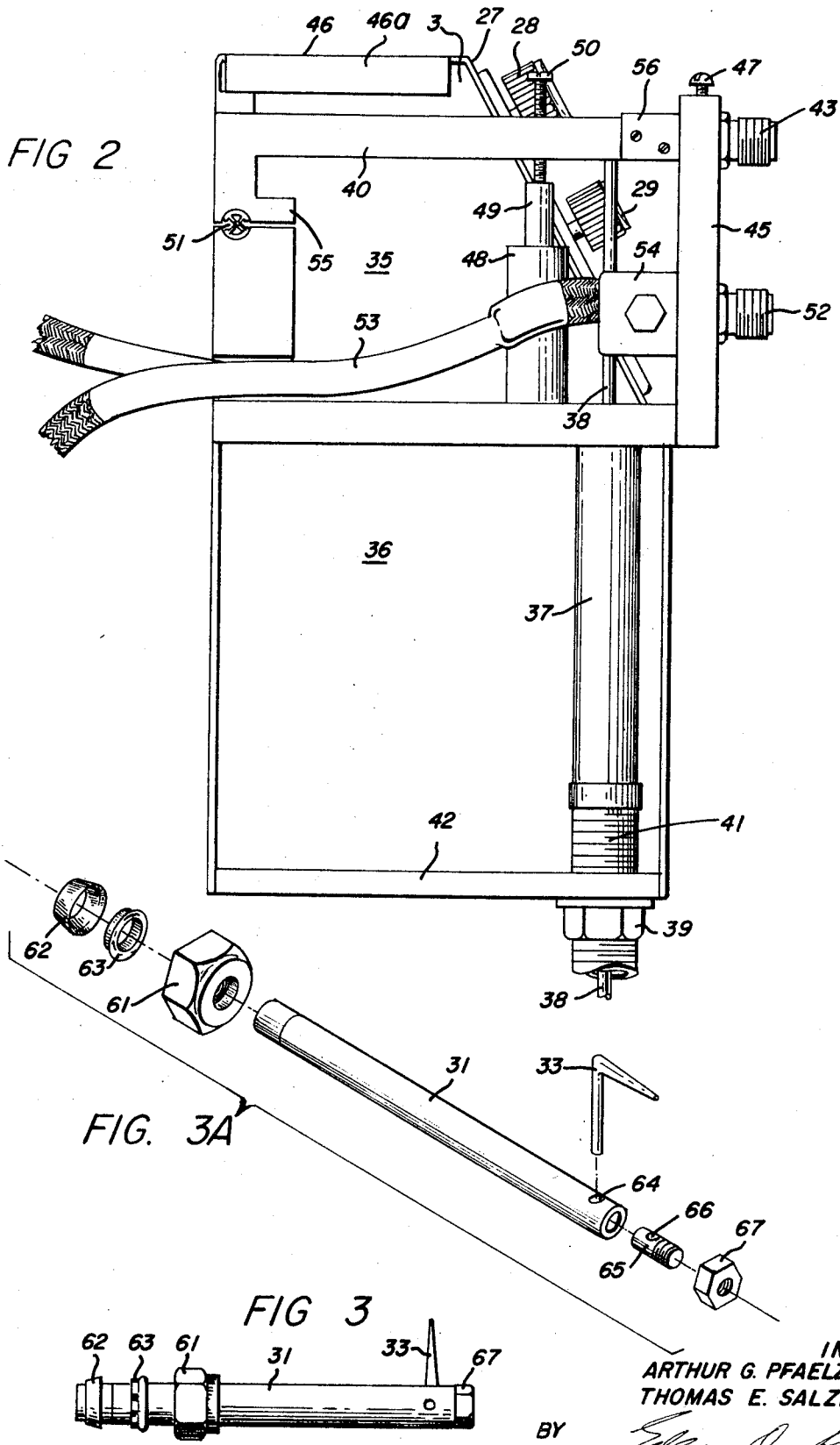

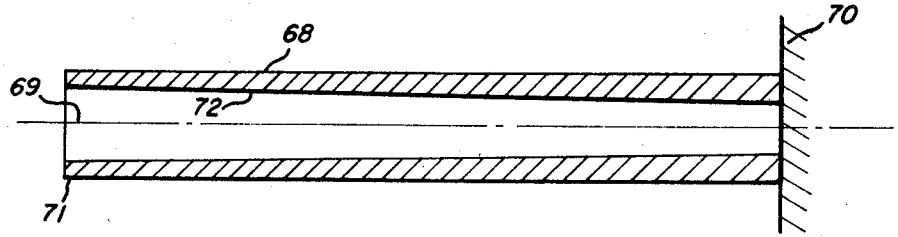
FIG. 4
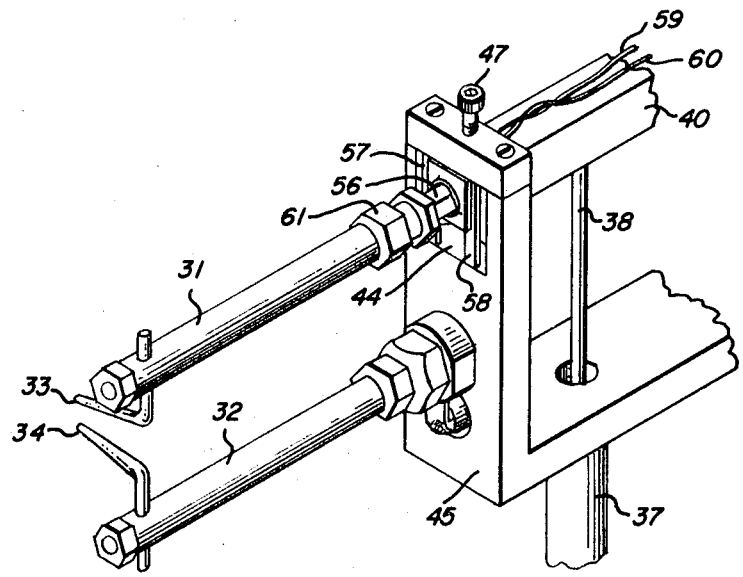
FIG. 2A
FIG. 6

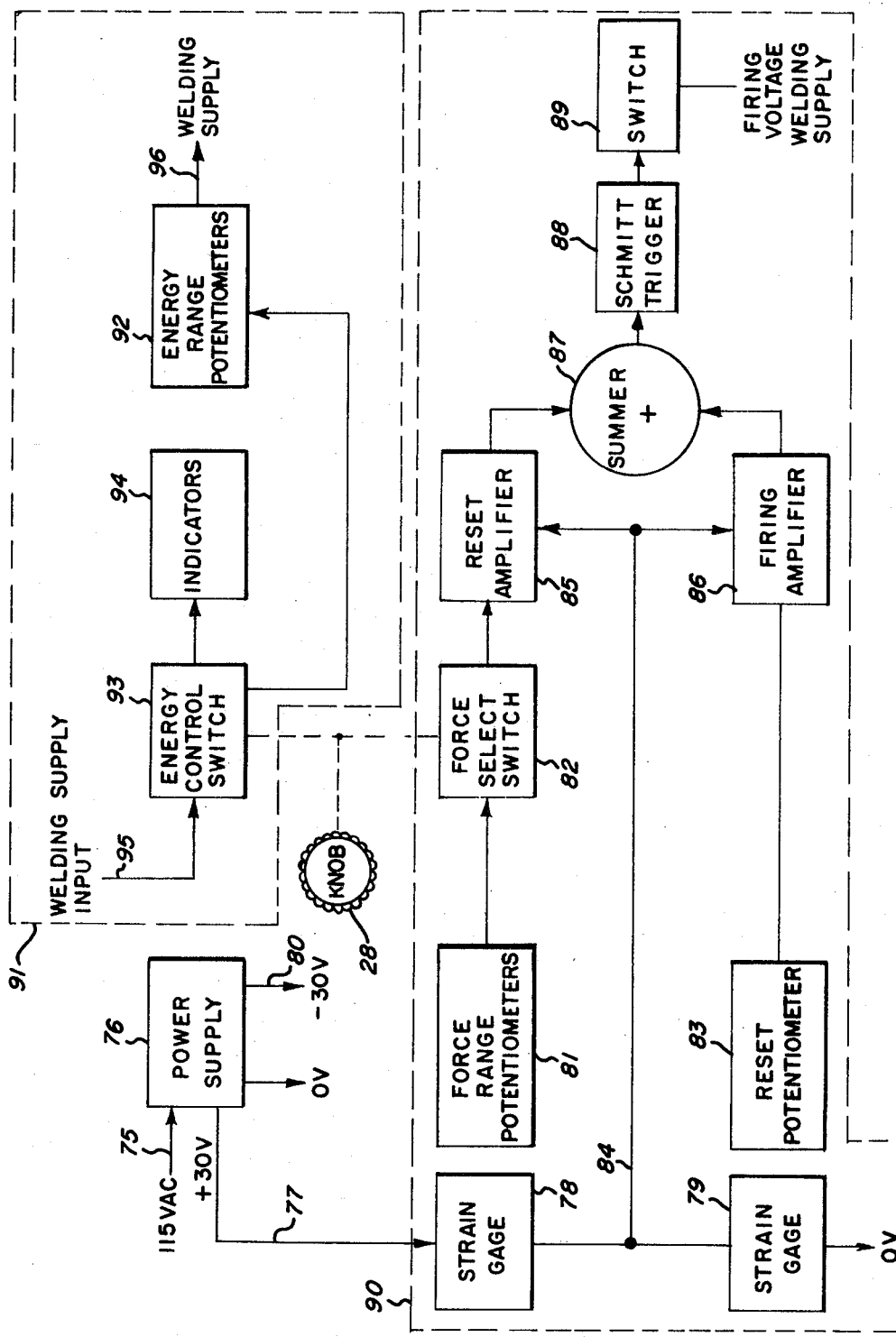

May 26, 1970   A. G. PFAELZER ET AL   3,514,569
RESISTANCE WELDER

Filed Dec. 28, 1967   5 Sheets-Sheet 5

INVENTORS
ARTHUR G. PFAELZER
THOMAS E. SALZER

BY

*Edgar O. Kost*

ATTORNEY

United States Patent Office 3,514,569
Patented May 26, 1970

3,514,569
RESISTANCE WELDER
Arthur G. Pfaelzer, Chestnut Hill, and Thomas E. Salzer, Bedford, Mass., assignors to Raytheon Company, Lexington, Mass., a corporation of Delaware
Filed Dec. 28, 1967, Ser. No. 694,145
Int. Cl. B23k 11/10
U.S. Cl. 219—110                                 5 Claims

ABSTRACT OF THE DISCLOSURE

A resistance welding apparatus having dynamic force sensing and measuring means together with a self-contained electronically controlled automatic force firing level selector. A high compliance, high frequency horn structure supporting the welding electrodes results in the fabrication of the over-all welder without consideration of such critical mechanical factors as the mass in the moving system, the dynamic and static bearing response. A plurality of force-energy level combination settings are available to handle a large number of work piece material compositions and configurations.

Background of the invention

In the fabrication of electronic devices and components resistance heating to weld similar as well as dissimilar metallic materials has achieved wide acceptance. Commonly, resistance welding techniques include the disposition of the component work pieces between a movable and a stationary electrode. Passage of current serially through the electrodes and components causes the temperature of the latter to rise proportional to the square of the current multiplied by the resistance and other parameters. At a critical moment influenced by the pressure applied by the electrodes as well an the resistance of the work pieces the metals become fluid and the weld is completed. The current may then be removed and the components allowed to cool. Current and pressure then are of paramount importance in the achievement of satisfactory welds.

Resistance welding techniques encompass many variables which are capable of influencing the quality of the end product. The power supply introduces such factors as repeatability, pulse rise time, pulse length and number of pulses. The interaction of these variables with the others to be considered affords one an indication of the complexities associated with this art. Additionally, material factors, principally the chemistry and temperature rise time characteristics, as well as annealing and geometry, are involved in the achievement of the desired resistance weld.

The trend in recent years in the electrical welding art has been toward stored energy DC welders utilizing pulse lengths of .003 to .020 second and rise times of .0005 to .002 second. These fast pulses have necessitated the use of welding heads which are capable of maintaining a constant controlled force on the weld while the metal is rapidly melting. A need therefore exists for a welder which affords rigid control over the energy levels taking into consideration all the dynamic resistance fluctuations as well as the maintenance of a controlled force level during the time of weld.

Statement of the invention

In accordance with the teachings of the present invention a means for sensing a dynamic and static force is provided together with a precise controlled welding energy release actuator for a prescribed work load to be joined together by resistance welding means. Strain transducer means electronically control the welding power supply. Unique high compliance, high frequency welding horns enable the over-all resistance welding apparatus to be designed with relatively little regard for moving mass or bearing response. A combination of independently selected force and energy level values for a large number of materials enables relatively untrained personnel to achieve consistently successful welds. All energy and force combinations are preset and force levels in terms of ounces rather than pounds may be achieved which is highly desirable in elaborate modern day micro and integrated circuitry interconnections. The apparatus may be considered to define three interrelated subsystem. The welding head comprises a fixed and a movable arm supporting the welding electrodes and horn members having a frequency compliance increase severalfold over conventional welding horn structures. The head may be considered to be a radical departure from conventional prior art welders through the elimination of the bearing and rod commonly coupled between the microswitch and welding electrodes to thereby obviate many of the prior art mechanical vagaries.

The force sensing components comprise the second subsystem referred to as the force control unit. Included therein are the strain transducers mounted in the movable arm, self-contained regulated power supply, force firing level selectors, manual and automatic selection means, adjustable reset means and associated circuitry. The force control unit triggers the welder to fire by discharging the welding power supply output capacitor. For higher output and self-compensation paired strain transducers may be provided in the movable horn electrode supporting structure.

Finally, an energy control subsystem is provided having a series of potentiometers, switch sections, indicators and associated circuitry.

Briefly, the theory of operation provides for the force control unit to cause the welding supply to fire at a predetermined exerted force. The heart of the control unit is the strain transducer which forms one-half of a bridge circuit with a series of potentiometers forming the other half of this circuit. The strain transducer common outputs are fed to differential amplifiers. One of such amplifiers serves a comparative function and the other incorporates a protective feature. The amplifier outputs are summed in a trigger circuit coupled to the welder power supply. The energy control sets the level for each weld in conjunction with the force level selection means.

The reduction of moving system mass and dynamic bearing response from the welding apparatus has removed some prior art critically troublesome factors in the successful reproduction of welds. The threshold at which the weld is to be made is now precisely set on the basis of force exerted in the specific area of the weld. Relatively maintenance-free operation is afforded by the elimination of the spring-controlled bearing and rod combination found in most prior art welders. The preselection of the force and energy levels has also considerably reduced costs due to faulty and inferior welds.

Brief description of the drawings

The invention, as well as the details of the construction of a preferred embodiment, will now be described, reference being directed to the accompanying drawings, in which:

FIG. 2 is a side elevation view of the embodiment;

FIG. 2A is a partial front elevation view of the embodiment;

FIG. 3 is a perspective of the welding horn and electrode tip assembly;

FIG. 3A is an exploded view of the assembly shown in FIG. 3;

FIG. 4 is a detailed longitudinal cross-sectional view of an illustrative horn electrode of the invention;

FIG. 5 is a block diagram of the electronic circuitry of the over-all embodiment of the invention;

FIG. 6 is a schematic circuit diagram of the power supply of the apparatus of the invention;

FIG. 7 is a schematic circuit diagram of the force control circuitry of the invention; and FIG. 8 is a schematic circuit diagram of the differential amplifier means of the present invention.

Description of the preferred embodiment

Figure 1:
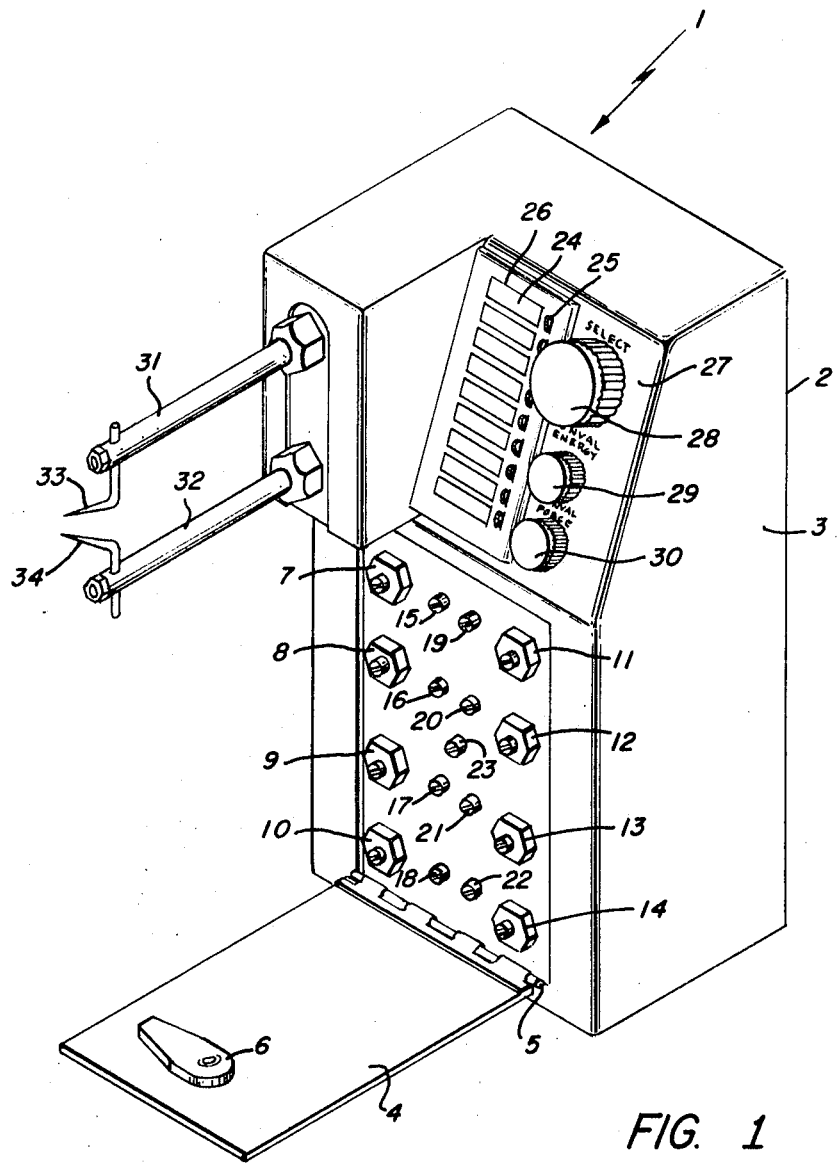
FIG. 1 is a perspective view of an illustrative embodiment of the invention.

Referring to the drawings, particularly FIGS. 1 and 2, the over-all welding apparatus is indicated by the numeral 1 and is contained within a housing 2. The side panels 3 may be removable to facilitate access to the controls and electronic circuitry and a front panel 4 is hinged as at 5 to expose the force and energy level setting controls. A pivot latch 6 maintains the hinged front panel in the closed position during the operation of the welder. The potentiometers which are preset are arranged in paired columns to facilitate, in this particular embodiment, eight possible force-energy combinations, Potentiometers 7–14 inclusive in the outer columns are utilized for the energy range settings while the inner exposed members 15–22 inclusive provide the means for the preselection of the force levels at which the welder operation is preferred. Potentiometer member 23 is utilized for the reset reference voltage setting values as will be hereinafter described.

A plurality of placards 24 together with dials 25 may be mounted within openings 26 in the upper slanted portion of the front wall of the apparatus designated 27. The numerous control settings for a variety of materials to be welded may be catalogued and indicated on the welder apparatus for easy reference by the operator at all times. The select knob 28 disposed on the upper portion 27 may be indexed to any of the desired combinations afforded by the automatic controls. In addition, the automatic force firing control as well as energy level controls may be operated manually for initial setup, quick checks and troubleshooting. An appropriate stop, therefore, in the controls actuated by knob 28 would provide for the disconnecting of the potentiometers for force and energy level settings. Manual control of the firing levels may now be had by means of knob 30 positioned at any of the eight force levels provided by the individual potentiometers. Ranges of ounces to pounds will be available for selection. Similarly, knob 29 provides for the variable manual selection of the energy levels to add to the flexibility of the welder apparatus disclosed herein.

The high frequency, high compliance welding horns 31 and 32 project beyond the front of the housing 2 and welding electrodes 33 and 34 are supported at the outer ends thereof. With attention being directed to FIGS. 2 and 2A, the mechanical system associated with the actuation of the electrodes and mechanical components of the welder apparatus will now be described. For the sake of clarity all wiring and electronic circuitry has been omitted; however, it may be noted that such components and subsystems are positioned within the areas designated 35 and 36. A self-contained pylon 37 with a rod 38 extending axially therein is joined at one end to the moving system of the welder comprising the arm member 40. The lower end of the pylon structure is threaded as at 41 and extends through the bottom wall 42 of the welder. The threaded portion 41 may be suitably positioned in a matching aperture in the table top and nut 39 fastens the welder in the desired position. The lower end of rod 38 may be connected to any conventional source such as a foot treadle, knee treadle or air cylinder (not shown) to exert a pulling force on the moving arm 40 for movement of an appended horn and electrode structure secured thereto by means of threaded member 43. The movable end of member 40 extends within a channel 44 in front panel member 45. A return stop set screw 47 controls the distance of travel of the movable arm 40.

A hydraulic dashpot structure 48 defining a plunger 49 provides for damping of the velocity of the movable electrode arm 40 and a pressure adjusting screw 50 extends through this member. The maximum preferred force for most applications will be 20 pounds.

The movable portion of the apparatus is pivotally supported by an extensible cross-membered device 51 commercially available under the name "Free Flex" and manufactured by the Bendix Corporation. The stationary portion of the welding horn system is secured to front panel member 45 through a cylindrical member 52 threaded similarly to member 43. Welding current carrying cable 53 is secured to bracket 54. The movable arm is connected to a similar cable through the L-shaped extension 55 on the arm member 40. The cables extend from the welding supply (not shown) which may comprise any standard capacitor-discharge type welder such as for example the Model 60C supply manufactured by the Raytheon Company.

A top wall member 46 defining a lip section 46a provides a securing structure for the side panels 3.

In accordance with the teachings of the invention strain transducer means are mounted adjacent the supported end of movable electrode 31 and are housed in the area underlying cover plate member 56. Strain transducers, also referred to as gages, are extremely sensitive to any force and respond in electrical signal outputs which are utilized in the electronic circuitry, hereinafter described, for the control of all the functions of the welder. Since the torsion factor is deemed critical in that it affects the outputs of tthe strain gages the method employed herein of mounting the strain gages cancels out any changes due to torsion. Gages employing semiconductor materials are preferably positioned in such a manner that an upward force exerted on the movable arm causes the lower strain gage to be in tension and the upper gage in compression. Through the use of dual gages a higher output and self compensation is thereby realized.

Pads 57 and 58 of a material such as "Teflon," a registered trademark, are positioned on either side of the movable arm 40 to isolate this member from the walls of channel 44 in front panel member 45. These pads will serve to limit any lateral displacement of the moving system and serve as an effective bearing for the movable arm member in arriving at the desired compliance. The sole degree of freedom, then, in the moving system of the disclosed apparatus will be in a vertical direction. Wires 59 and 60 serve to channel the electrical output signals from the semiconductor strain gages within the movable arm.

Referring next to FIGS. 3 and 3A, the welding horns employed in the present invention are illustrated. The horns may be fabricated of a light weight metal and have a structural configuration dictated solely by the compliance to the natural frequency ratio parameter desired upon the exertion of the force at the electrode tips for producing of the weld. A cantilevered welding horn structure, illustratively the movable member designated by the numeral 31, is easily secured to threaded member 43 of arm 40 by means of hexagonal lock nut 61 together with flared seat 62 which extends into the hollow passageway defined within the threaded member. A flared flange member 63 is secured to the horn member 31 adjacent to one end thereof to securely fasten same at the end of the welder arm. The cantilevered horns can be adjusted for projection along their main axes by loosening the lock nut 61 and further the horns may be rotated along their minor axes to accommodate mating welding electrodes. At the free end of each of the horn members a welding electrode, illustratively designated 33, is provided of a metal such as copper. The welding electrode is inserted through an aperture 64 in the walls of the horn member as well as threaded plug insert 65 having a mating aperture 66. Hexagonal nut 67 positioned at the tip of the welding horn member is threaded on the plug member 65 to securely lock the welding electrode at the tip of the horn member.

In an analysis of prior art welders it was noted that the welding electrode member extending beyond the welding head may be considered as a cantilevered beam when studying means for improvement of the response of a welding electrode to the actuating means and the problems associated with maintaining a desired force on the melting metallic work pieces. The horn electrode members may be fabricated of a material such as aluminum as a means of increasing the response of the welding electrode to the actuator. In the well known physics of the cantilevered beams with a constant stress applied at the free end the stress may be derived by the appropriate formula $Mc/I$ where $M$=moment=force$\times$length and $I$=a function of distance from neutral axis (midpoint) to tip. To secure a faster response it was concluded that the removal of material at the free end of the beam is desired. In the illustrative embodiment the cantilevered welding horn selected therefore comprises a tubular cylinder. The theoretical calculation for beams of this configuration discloses that the cross-sectional area of said member shall be gradually reduced in a direction away from the supported end to secure the fastest response.

Referring next to FIG. 4, an illustrative example of the teachings of the invention provides that a tubular cylinder 68 having a longitudinal axis 69 when supported as at 70 shall define a gradually tapering wall portion 72 extending along the major axis of the member. At the free end 71, then, the thickness of the wall is substantially reduced from that dimension adjacent to the supported end. While a linearly varying tapered wall is illustrated, other wall configurations such as a parabolic varying configuration may be practiced. The important feature resides in the fact that to secure the high frequency compliance ratio all the variable parameters are designed into the welding horn which permits the design of a replaceable welding electrode tip whose mass provides little or no effect in the moving system of the over-all welder. Removal of the criticality of the welding tip configuration through the novel and unique welding horn configuration has resulted in a frequency compliance ratio of approximately 2.7 times that of a copper welding electrode conventionally employed in the prior art. A constant stress is readily maintained on the work piece components during the welding operation and excellent damping after completion of the weld has resulted.

It will be noted that the over-all welder apparatus has now been provided with a welding horn and electrode structure which facilitates the fabrication of the complete system without reliance on bearings, springs or microswitches conventionally employed in all prior art welders. To complete the understanding of the invention the electronic circuitry associated with the selection of the force and energy levels in the welding operations will now be described.

Referring to FIG. 5, a block diagram of the complete embodiment is illustrated. The circuitry may be divided into three subsystems comprising the following functions:

(1) Power supply;
(2) Force firing level control; and
(3) Weld energy control.

The welder apparatus operates from a 115 volt AC line voltage coupled through terminal 75 to a completely regulated power supply 76 having large filter capacitors to assure against line voltage surges. A branch connection 77 provides, preferably, positive 30 volts DC to bias strain gages 78 and 79 oriented as hereinbefore described with relation to the moving arm 40. The strain gages form one-half of a bridge circuit which is coupled to the same bias supply while the remaining electronic circuitry utilizes both positive and negative 30 volts DC. Terminal 80 provides for connection of a power supply to the negative DC voltages.

The force control subsystem causes the welder supply to discharge at a predetermined welding electrode force level. The subsystem is coupled to the output of the strain gages 78 and 79 and includes force range potentiometers which may incorporate any number of preset force levels in a range of several ounces to many pounds as determined by the particular welding schedule desired. The potentiometers are connected to automatic select knob control 28 described in connection with FIG. 1 as well as manual mode knob 30. The heart of the force control subsystem is a bridge utilizing the strain gages 78 and 79 as one-half and the other half consisting of force range potentiometers 81 and the reset potentiometer 83. The function of the reset potentiometer is to disable the force control subsystem until the force after the weld has been made decreases below a preset level. This protective feature prevents the unintentional institution of a successive weld on a completed weld. The control for the reset potentiometer is designated 23 in FIG. 1.

A common terminal 84 couples the strain gage outputs to differential amplifiers 85 which compares the strain gage voltages with the reset voltage and 86 which compares the strain gage voltages with the firing voltage. The amplifier outputs are single ended through a summer 87 to control a Schmitt trigger circuit 88 and semiconductor switch 89 which fires the capacitor discharge welding supply. The entire force control subsystem is delineated by the dotted line 90 and the differential amplifier circuit as well as the trigger circuit will be described in greater detail hereinafter.

The energy control subsystem is delineated by dotted line 91 and includes a plurality of energy range potentiometers 92 and an index switch 93 for either automatic or manual control. Knob 28 also provides for the automatic operation in combination with the force levels desired and knob 29 the manual mode of operation. Indicators 94 collectively define the plurality of placard means 24 in the openings 26 as shown in FIG. 1 which may also be individually illuminated. The energy control circuit operates in conjunction with the welding supply to establish the energy for a weld and is connected thereto through input terminal 95 and output terminal 96.

Referring to FIG. 6, the power supply 76 comprises the input line voltage which is coupled through switch 97 and fuse 98 to the primary winding transformer 99. There is thus provided approximately two 70 v. RMS outputs into full wave rectifier bridges 100 and 101 through secondary windings 102 and 103. Capacitors 104 and 105 provide energy storage to reduce ripple to a tolerable amount. Under a no load condition the capacitors would act as peak detectors with a DC output of approximately 100 volts DC. Under full load conditions the output voltage would be approximately 63 volts DC. The actual operating voltage will lie somewhere between these two figures. Resistors 106 and 107 serve as bleeder resistors to discharge capacitors 104 and 105 when the power is turned off to alleviate any shock hazards. Zener diodes 108 and 109 in conjunction with series dropping resistors 110 and 111 provide a regulated ±30 volt DC supply. Series resistor 112 and Zener diodes 113 and 14 provide a highly regulated +18 volts DC for the operation of the bridge in connection with the force control subsystem. A resistor 115 and neon light 116 are connected in parallel across the input circuit line to indicate when the power supply is operative.

Referring next to FIG. 7, the force control subsystem will now be described. For the sake of simplicity only two force range potentiometers 117 and 118 are shown. In the illustrative embodiment with the provision of eight individual automatic force firing level settings and one manual setting, seven additional potentiometers would be connected in parallel. As previously stated, the bridge circuit includes first, strain gages 78 and 79 mounted on the welder arm and the other half of the bridge circuit comprises the force range of potentiometers, scale factor resistors 119 and 120, together with the reset potentiometer 121. Resistors 122 and 123 are placed in the circuit so that the total impedance of both sides of the bridge are approximately equal. This provides for optimum sensitivity of the over-all bridge circuit. Scale factor resistors 119 and 120 provide for the selection of a force range, illustratively 0 to 15 pounds. The effect of resistor 119 is to reduce the force range as this resistor is decreased in value. Resistor 120 shifts the range up or down. By proper selection of the values of resistors 119 and 120 the proper force range up to 15 pounds can be selected. Resistor 120 is correctly set when the minimum force that can be set on the force range potentiometer is 0 pounds.

The potentiometer 121 selectes the reset reference voltage. The function of the reset force level potentiometer is to safeguard against making a weld on an already completed weld. Before the welder can be refired after once having made a weld the force exerted on the work must be reduced below the value determined by the potentiometer. For example, if the welder fires at 5 pounds force, it might be adjusted for a reset force of 1 pound. This is a completely independent adjustment and is in effect at all times that the welder is operated. Resistors 124 and 125 may illustratively be selected to provide a reset range of from —2.5 pounds to +2.5 pounds. The output of this potentiometer is fed by line 126 to the reset amplifier 85. Since all the potentiometers are connected in parallel and since the base current flowing into the input transistor in the differential amplifier circuits 85 and 86 is very small compared to the current flowing through each potentiometer, there is no appreciable interaction. Therefore, setting one potentiometer will not affect the output voltage of any other potentiometer.

The individual circuits defined within the differential amplifiers 85 and 86 will be hereinafter described and reference is now directed to the remaining portion of the force control subsystem circuitry including the summer 87, Schmitt trigger 88 and switch 89 which operates with the inputs received from the differential amplifiers 85 and 86. Unidirectional diode 127 clamps the output of differential amplifier 85, and similarly, diode 128 clamps the output of differential amplifier 86 so that it cannot swing negative. The amplifier outputs are summed by resistors 129 and 130 and applied to the base of transistor 131 through diode 132. The diode 132 prevents reverse base-to-emitter breakdown of the transistor 131.

The Schmitt trigger 88 includes transistors 131 and 133 and is biased in such a manner that a ±5 v. DC input is required for a change of state. This means that transistor 131 turns on with a +5 volts DC input and is nonconductive with a —5 volts input. When the strain gage voltage exceeds the firing voltage reference the output of amplifier 86 becomes greater than +10 v. DC. With amplifier 85 clamped at 0 v. DC the summed input to transistor 131 is greater than +5 v. DC and this transistor becomes conductive.

The Schmitt trigger cannot reset until the strain gage output falls below the reset voltage reference. At this time amplifier 86 is clamped to 0 v. DC and amplifier 85 falls below —10 v. DC. The summed voltage is more negative than —5 v. DC and the trigger is back in the reset state. When the Schmitt trigger fires this turns on transistor 134 which is a P-N-P type. The welding supply is then able to discharge and thus make the weld at the precise force required. Diode 135 is serially connected in the emitter branch of the circuit of transistor 134 to prevent any breakdown of transistor 134. Resistors 136, 137, 138 and 139 are utilized to determine the reset or turnoff voltage and large voltage hystersis for operating the semiconductor switch which fires the welding supply. Resistors 136 and 137 determine the —5 v. DC voltage and resistors 138 and 139 determine the firing voltage level of +5 v. DC.

Referring now to FIG. 8, one of the two differential amplifiers 85 and 86 will be described. It is noted that the amplifiers are identical in most respects and may be referred to as a direct coupled two stage amplifier. The firing amplifier 86 utilizes a N-P-N differential first stage including transistors 140 and 141 to drive the P-N-P differential second stage including transistors 142 and 143. For the other amplifier, namely the reset amplifier 85, the first stage would employ a differential P-N-P transistor and drive a P-N-P differential second stage. The output is single ended and is designed to be 0 v. DC for a 9 v. DC common input. Because of the symmetrical design and nonstringent input offset requirements no nominal balance resistor is required. Open loop voltage gain is approximately 500 volts per volt. The use of the two independent differential amplifiers makes it unnecessary to control the gain up to the Schmitt trigger. Therefore, variations in open loop gain are of little consequence as long as gain is sufficiently high. Resistors 144, 145, 146 and 147 along with resistor 148 are included in the differential amplifier circuit. Resistors 149 and 150 together with capacitor 151 form an input low pass filter to prevent high frequency signals, as might occur when the welder fires, from affecting the operation of the Schmitt trigger 88.

The energy control subsystem has not been illustrated in detail in the interest of clarity and includes a series of potentiometers individually connected to the switch 93 as shown in FIG. 5. The indicators as well as the manual or automatic mode of operation follow conventional wiring techniques with the automatic selection controlled by knob 28. The individual potentiometer settings may be made through the screw members 7–14 as shown in FIG. 1. The desired energy level settings are made through the use of a calibrator probe which is placed between the welding electrodes and the setting of the automatic control switch at any of the indexed positions. Input and output leads to the welding supply are also provided.

There is thus provided an accurate and repeatable control of the force and energy levels at which a welder fires in conjunction with high sensitivity semiconductor strain gages mounted on one of the arms of the welder head. The force range potentiometers all operate similarly with the exception of the output voltage from each potentiometer. The combination of the strain gages and potentiometers forms the bridge circuit which supplies the differential amplifiers with identical voltages at two times during the welding operation. The first time is when the bridge is balanced as the weld is in process of being made. The second time is when the reset force is reached. As the upper movable welding electrode mates with the lower electrode, a strain is exerted on the gages within the upper horn member of sufficient magnitude to cause a change in resistance. When one gage increases in resistance the companion gage decreases, thereby providing a ratio that varies with strain. This varying incremental ratio gives an accurate measure of strain on the gages and is the principal mechanism on which the high degree of repeatability in the welding performance is founded.

Considerable structural simplification and accompanying cost reduction in the design of welding apparatus may be achieved through the teachings of the present invention. A protective feature in the provision of the adjustable reset forces potentiometer circuit is provided to prevent the firing of the welder after a weld has already been made. The provision of the welding electrodes appended to the long compliant horns results in a higher frequency response compared to prior art short welding structures which are extremely sensitive to any mass in the moving system. It may also be noted that the present invention has eliminated the need for microswitches, bearings and spring loaded structures with accompanying reduction in cost of construction as well as maintenance. breakdown times as well as setup times are also improved to result in higher efficiencies in operation. The settings afforded through the automatic control of the force and energy levels further permits the utilization of production personnel with a minimum of training and supervision to consistently yield satisfactory welds.

While a specific detailed illustrative embodiment has been shown and described herein, it is intended that this description be considered not in a limiting sense but rather as exemplary of the broader aspects of the invention as defined in the accompanying claims.

What is claimed is:

1. An electrical resistance welding apparatus comprising:
   a primary welding power source;
   an oppositely disposed spaced welding electrode assembly adapted to conduct welding current pulses through a work piece load supported therebetween;
   dynamic force sensing and measuring means activated by said electrode assembly to generate an electrical signal determinative of the varying force applied to said load;
   a plurality of electrical reference voltage generation means responsive to predetermined settings indicative of selected force level values;
   balanced bridge circuit means coupled to said force sensing and reference voltage means to generate an electrical output signal;
   means for amplifying and comparing the sensing means signals and reference voltage signals to generate a net differential signal representative of the compared values; and
   an electronic trigger circuit actuated by said differential signal to initiate the weld cycle upon attainment of the precise preselected force threshold levels.

2. An electrical resistance welding apparatus according to claim 1 wherein said electrode assembly includes a stationary and a movable member with said dynamic force sensing and measuring means cooperating with said movable member.

3. An electrical resistance welding apparatus according to claim 1 wherein said dynamic force sensing and measuring means comprise a pair of strain transducer gages positioned in such a manner that one gage is under tension and the other is under compression upon the exertion of force on the work piece load to provide an incremental ratio of resistances varying with the exerted force.

4. An electrical resistance welding system comprising in combination with a primary welding power source:
   oppositely disposed cantilever suspended electrode members;
   dynamic force sensing and measuring means to generate an electrical signal upon the application of varying force to a work piece load supported between the free ends of the electrode members;
   an electronically controlled automatic weld pulse firing circuit means responsive to signals determinative of preselected force threshold levels;
   said circuit means comprising a first subsystem having a self-contained regulated independent power supply of direct current voltages;
   a second subsystem including the force sensing means, a plurality of force firing level and reset potentiometer selector means, reset and firing differential amplifier means, signal summing means and electronic trigger means to fire the welding power source;
   said reset differential amplifier means in conjunction with said reset potentiometer means serving to prevent said second subsystem from unintentionally initiating a weld power pulse on an already welded work piece load; and
   a third subsystem including a plurality of energy range potentiometer means, indicator means and switch means for selecting the magnitude of the welding current pulses passed by the welding electrodes at the time of the attainment of the preselected force threshold firing levels.

5. An electrical resistance welding apparatus comprising:
   a primary welding power source;
   oppositely disposed welding electrode means including a cantilever supported stationary and movable member;
   means including strain transducer gage means for sensing and measuring the force exerted on a work piece load disposed between said electrode members and generating an electrical signal output;
   means responsive to said force sensing and measuring means signal output for electronically triggering the welding power source at a predetermined force threshold value;
   said force sensing and measuring means being disposed adjacent to the supported end of said cantilevered movable member.

References Cited

UNITED STATES PATENTS

| | | | |
|---|---|---|---|
| 3,068,350 | 12/1962 | Archer | 219—110 |
| 3,140,383 | 7/1964 | Bauer | 219—110 |
| 3,191,000 | 6/1965 | Nyborg | 219—86 |
| 3,390,248 | 6/1968 | Illingworth | 219—110 X |

ANTHONY BARTIS, Primary Examiner

R. E. O'NEILL, Assistant Examiner

U.S. Cl. X.R.

219—86